United States Patent
Teranishi et al.

(12)

(10) Patent No.: US 6,511,753 B1
(45) Date of Patent: Jan. 28, 2003

(54) PROCESS FOR PRODUCING ARTICLE COATED WITH WATER-REPELLENT FILM ARTICLE COATED WITH WATER-REPELLENT FILM AND LIQUID COMPOSITION FOR WATER-REPELLENT FILM, ARTICLE COATED

(75) Inventors: Toyoyuki Teranishi, Osaka-fu (JP); Kazutaka Kamitani, Osaka-fu (JP); Takashi Sunada, Osaka-fu (JP)

(73) Assignee: Nippon Sheet Glass Co., Ltd., Osaka-fu (JP)

( * ) Notice: Subject to any disclaimer, the term of this patent is extended or adjusted under 35 U.S.C. 154(b) by 0 days.

(21) Appl. No.: 09/701,752

(22) PCT Filed: Jun. 3, 1999

(86) PCT No.: PCT/JP99/02985
§ 371 (c)(1),
(2), (4) Date: Dec. 1, 2000

(87) PCT Pub. No.: WO99/63022
PCT Pub. Date: Dec. 9, 1999

(30) Foreign Application Priority Data

Jun. 4, 1998 (JP) ............................................ 10-156337

(51) Int. Cl.[7] ............................. B32B 9/04; B05D 3/02; C08G 77/24
(52) U.S. Cl. ...................... 428/447; 428/429; 427/164; 427/165; 427/387; 106/287.16; 528/10; 528/20; 528/42
(58) Field of Search ................................ 427/164, 165, 427/387; 428/428, 429, 446, 447; 524/765, 767; 106/287.16; 528/20, 10, 42

(56) References Cited

U.S. PATENT DOCUMENTS

| 5,424,130 | A | * | 6/1995 | Nakanishi et al. ........... 428/410 |
| 5,556,667 | A | * | 9/1996 | Teranishi et al. ......... 427/163.1 |
| 5,895,722 | A | * | 4/1999 | Kobayashi et al. ......... 428/428 |
| 5,997,943 | A | * | 12/1999 | Azzopardi et al. .......... 427/165 |
| 6,033,738 | A | * | 3/2000 | Teranishi et al. ........... 427/387 |
| 6,258,156 | B1 | * | 7/2001 | Azzopardi et al. ..... 106/287.14 |

* cited by examiner

*Primary Examiner*—Robert Dawson
*Assistant Examiner*—Michael J Feely
(74) *Attorney, Agent, or Firm*—David G. Conlin; John B. Alexander; Edwards & Angell, LLP

(57) ABSTRACT

In a process for producing a product coated with a water repellent film which comprises applying on a base substrate a coating liquid containing a silicon alkoxide, a fluoroalkyl group-containing silane compound and an acid dissolved in a solvent and drying; the process for producing a product coated with a water repellent film being characterized in that said coating liquid contains: said silicon alkoxide or a hydrolysate thereof is present at a concentration equivalent to 0.01 to 2% by weight of silica formed by hydrolysis of the silicon alkoxide, said fluoroalkyl group-containing silane compound is present at a concentration equivalent to 0.00001 to 0.15% by weight of silica formed by hydrolysis of the fluoroalkyl group-containing silane compound, 0.003–3 normality of said acid, and 0–20% by weight of water. The invention further provides water repellent products having a good rolling properly of water drops, a high scratching resistance and a high weatherability prepared by the process of the invention.

20 Claims, No Drawings

PROCESS FOR PRODUCING ARTICLE COATED WITH WATER-REPELLENT FILM ARTICLE COATED WITH WATER-REPELLENT FILM AND LIQUID COMPOSITION FOR WATER-REPELLENT FILM, ARTICLE COATED

This application claims the benefit of PCT Application Serial No. PCT/JP99/02985 filed Jun. 3, 1999, which is now abandoned, the teachings of which are incorporated herein by reference.

TECHNICAL FIELD

The present invention relates to a water repellent product comprising a water repellent film formed on a surface of a base substrate such as glass, ceramic, plastic, metal or the like.

BACKGROUND ART

Technologies have been known in which an undercoat layer such as silica or the like is formed between a base substrate and a water repellent layer for the purpose of improving the bonding strength between the base substrate and the water repellent film, when the water repellent film is formed on a surface of the base substrate such as a glass plate or other base substrates, and for preventing the diffusion of an alkaline component from base substrate to a product coated with a water repellent film and increasing the durability of the water repellent film, when the base substrate contains an alkaline component.

As methods for forming the undercoat layer and the water repellent film, there have been known a method in which a two-layer film structure is produced by forming a water repellent film after forming an undercoat film such as silica or the like on a base substrate, and a method in which a mixed solution composed of an undercoat component and a water repellent component is formed to be film on a base substrate to produce a single layer film acting as the undercoat layer and the water repellent layer. The latter method is superior in productivity because of fewer film making steps, and includes those disclosed in Japanese Patent Publication No. 24554 of 1988, Japanese Laid-open Patent Publication No. 215235 of 1986, 68477 of 1989, 338137 and 359086 of 1992 and 239653 of 1996.

The Japanese Patent Publication No. 24554 of 1988 discloses a water repellent surface treatment agent formed by modifying a silanol oligomer (20- to 40-mer) with a fluoroalkylsilane.

The Japanese Laid-open Patent Publication No. 215235 of 1986 discloses a low-reflection rate glass having water repellent properties and soil-resistant properties produced by applying on a surface of a base substrate a solution in which a fluoroalkyl group-containing silane compound and a silane coupling agent are hydrolytically reacted using acetic acid and a catalyst composed of an organic tin compound in an alcoholic solvent to form a copolycondensate, and then heat-curing.

The Japanese Laid-open Patent Publication No. 68477 of 1989 discloses a process for producing a water repellent steel sheet which comprises applying an alcoholic solution containing an alkoxide of silicon and a fluoroalkylsilane on a surface of the steel sheet and then heating.

The Japanese Laid-open Patent Publication No. 338137 of 1992 discloses a water repellent glass which comprises applying a solution formed by mixing a silicon alkoxide, a substituted silicon alkoxide in which a part of the alkoxyl group is replaced by a fluoroalkyl group, alcohol, water and an acid (or a base) on a surface of a glass substrate and then calcining.

The Japanese Laid-open Patent Publication No. 359086 of 1992 discloses a process for producing a water repellent glass which is calcinated after a coating solution formed by mixing a fluoroalkylsilane or alkylsilane into vehicle which is obtained by being hydrolytically reacted polycondensated under coexisting with water, alcohol and catalyst is applied on a surface of a glass.

The Japanese Laid-open Patent Publication No. 239653 of 1996 discloses a water repellent product produced by treating with a composition in which a mixture of a perfluoroalkylalkylsilane and a completely hydrolyzable silane (for example, tetrachlorosilane) is dissolved in a solvent, preferably a non-aqueous solvent.

Since, in the methods disclosed in the Japanese Patent Publication No. 24554 of 1988, Japanese Laid-open Patent Publication Nos. 215235 of 1986 and 338137 and 359086 of 1992, a polycondensate and a copolycondensate are formed in a solution for coating before applying by hydrolyzing a fluoroalkyl group-containing silane and a silicon alkoxide utilizing a catalytic reaction in an alcoholic solution, where the compactness of the water repellent film is low. Therefore, in order to improve the compactness, a calcination step is required which is a factor in increasing costs.

In the method disclosed in the Japanese Laid-open Patent Publication No. 68477 of 1989, since reactivity is inferior due to the absence of a catalyst, the compactness of the water repellent film is low. Therefore, in order to improve the compactness, a calcination step is required which is a factor in increasing costs.

In the method disclosed in the Japanese Laid-open Patent Publication No.239653 of 1996, blending and storage of a coating liquid should be carried out in a water-free environment because of extremely high reactivity of a chlorosilyl group in chlorosilane used in the composition for coating and this is a factor in increasing costs. In addition, the surface of the water repellent film formed by this method is inferior in scratching resistance. Furthermore, in all the water repellent products produced by the prior art methods described above, the rolling property of water drops representing the dynamic water-repellent performance can not be said satisfactory.

The purpose of the present invention is to produce a water repellent product having a good rolling property of water drops, a high scratching resistance(abrasion resistance) and a high weatherability with an excellent productivity and without requiring a calcination step at high temperatures.

DISCLOSURE OF THE INVENTION

Accordingly, the present invention is a process for producing a product coated with a water repellent film which comprises applying on a base substrate a coating liquid containing a silicon alkoxide (A), a fluoroalkyl group-containing silane compound (B) and an acid (C) dissolved in a solvent and drying; said process for producing a product coated with a water repellent film being characterized in that said coating liquid contains:

(A) 0.01–2% by weight (based on $SiO_2$ equivalent: MW=60) of a said silicon alkoxide or a hydrolysate thereof (B) 0.00001–0.15% by weight (based on $SiO_2$ equivalent: MW=60) of a said fluoroalkyl group-containing silane compound (C) 0.003–3 normality of said acid, and (D) 0–20% by weight of water Furthermore, the present invention is a process for producing a product coated with a water repellent film which comprises applying on a base substrate a coating liquid containing a silicon alkoxide, a fluoroalkyl group-containing silane compound and an acid dissolved in a solvent and drying; said process for producing a product coated with a water repellent film being characterized in that said coating liquid contains the silicon alkoxide existing in the form of a monomer (including hydrolysate) or a polymer that is less 20-mer.

The language "% by weight (converted to silica)" used throughout the specification is intended to mean that the component of the coating liquid is present at a % by weight based on a $SiO_2$ equivalent: MW=60.

In the present invention, the silicon alkoxide (component A) used in the coating liquid described above may include tetramethoxysilane, tetramethoxysilane, tetrapropoxysilane, tetrabutoxysilane and the like. Among them, those having relatively small molecular weight, for example, tetraalkoxysilane composed of alkoxyl groups having 3 or less carbon atoms are apt to form a compact film and therefore are preferably used. In addition, polymers of these tetraalkoxysilane having an average degree of polymerization of 5 or less may also be used.

As the fluoroalkyl group-containing silane compound used in the present invention, silane compounds containing a fluoroalkyl group and having an alkoxyl group, an acyloxy group or silane compound containing hydrolysate group such as a chlorine group can be preferably used. Examples include compounds represented by the following chemical formulas (1). Single substance or a combination of plural substances from them can be used.

$$CF_3-(CF_2)_n-R-SiX_pY_{3-p} \quad (1)$$

Wherein n is an integer of 0 to 12 and preferably an integer of 3 to 12, R is a divalent organic group having 2 to 10 carbon atoms (for example, methylene group or ethylene group), or a group containing silicon atoms and oxygen atoms, X is H or a substituent selected from a monovalent hydrocarbon group having 1 to 4 carbon atoms (for example, alkyl group, cycloalkyl group or allyl group) or a derivative thereof, or p is 0, 1 or 2, and Y is an alkoxyl group or an acyloxy group or having 1 to 4 carbon atoms halogen atoms.

Examples of the compounds represented by the chemical formula (1) described above include the following compounds:

$C_6F_{13}CH_2CH_2Si(OCH_3)_3$ $C_7F_{15}CH_2CH_2Si(OCH_3)_3$ $C_8F_{17}CH_2CH_2Si(OCH_3)_3$ $C_9F_{19}CH_2CH_2Si(OCH_3)_3$ $C_{10}F_{21}CH_2CH_2Si(OCH_3)_3$ $C_6F_{13}CH_2CH_2SiCl_3$ $C_7F_{15}CH_2CH_2SiCl_3$ $C_8F_{17}CH_2CH_2SiCl_3$ $C_9F_{19}CH_2CH_2SiCl_3$ $C_{10}F_{21}CH_2CH_2SiCl_3$ $C_8F_{17}CH_2CH_2Si(CH_3)(OCH_3)_2$ $C_8F_{17}CH_2CH_2Si(OC_2H_5)_3$ $C_8F_{17}CH_2CH_2Si(OCOCH_3)_3$ $(CF_3)_2CF(CF_2)_8CH_2CH_2Si(OCH_3)_3$

Among them, $C_8F_{17}CH_2CH_2Si(OCH_3)_3$ (heptadecafluorodecyl trimethoxysilane) and $C_8F_{17}CH_2CH_2Si(CH_3)(OCH_3)_2$ (heptadecafluorodecyl methyldimethoxysilane), $C_8F_{17}CH_2CH_2SiCl_3$ (heptadecafluorodecyl trichlorosilane) and $C_8F_{17}CH_2CH_2Si(CH_3)Cl_2$ (heptadecafluorodecyl methyldichlorosilane) are preferred and heptadecafluorodecyl trimethoxysilane and heptadecafluorodecyl trichlorosilane are particularly preferred.

As regards to the kind of acid catalyst used in the present invention, volatile acids such as hydrochloric acid, fluoric acid, nitric acid, acetic acid and the like are preferred from a viewpoint in the fact that they can evaporate by drying at ordinary temperatures without remaining in the film, and amongst them, hydrochloric acid is particularly preferred from a view point in the fact that it has a high volatility an appearance of a water repellant film obtainable is relatively good, showing high durability and relatively safe in handling.

Regarding solvent, organic solvents can be used including hydrocarbons such as hexane, toluene and cyclohexane; halogenated hydrocarbons such as methyl chloride, carbon tetrachloride and trichloroethylene; ketones such as acetone and methyl ethyl ketone; nitrogen-containing compounds such as diethylamine; alcohols; esters such as ethyl acetate and so on. Among them, alcoholic solvents are preferably used which can easily dissolve acid. Examples include methanol, ethanol, 1-propanol, 2-propanol, butyl alcohol, amyl alcohol and the like. Amongst them, preferred are saturated chain monovalent alcohols having 3 or less carbon atoms, such as methanol, ethanol, 1-propanol and 2-propanol, because they have a high evaporating velocity at ordinary temperatures.

In the present invention, a coating solution can contain, for example, a small amount of methyltrialkoxysilane such as methyltrimethoxysilane, methyltriethoxysilane, methyltripropoxysilane and methyltributoxysilane besides said silicon alkoxide, said silane compound containing fluoroalkyl group and said acid in the amount of 50 wt % or less (converted to silica) of above described compound containing silicon alkoxide.

In the present invention, hydrolysis reaction shown by the equation (3) occurs between the silicon alkoxide and water by acid acting as a catalyst, during blending, during storage and after application, within coating liquid containing the silicon alkoxide, the fluoroalkyl group-containing silane compound, acid, solvent and water (water for dissolving the acid, water as an impurity in the solvents, water derived from the surrounding atmosphere and so on). In the equation, R represents an alkyl group.

$$(-Si-OR)+(H_2O)\rightarrow(-Si-OH)+(ROH) \quad (3)$$

In addition, the silanol groups (—Si—OH) produced by the hydrolysis reaction form a siloxane linkage (—Si—O—Si—) between themselves by dehydration condensation reaction as shown in equation (4):

$$(-Si-OH)+(-Si-OH)\rightarrow(-Si-O-Si-)+(H_2O) \quad (4)$$

Whether the hydrolysis reaction of the alkoxyl group in the silicon alkoxide occurs as shown by equation (3) in coating liquid containing the silicon alkoxide, the fluoroalkyl group-containing silane compound, acid, solvent and water, and similarly, whether the silanol groups (—Si—OH) produced by the hydrolysis reaction undergo dehydration condensation reaction as shown in the equation (4) between themselves have a great dependence on the concentration of acid in the solution, the concentration of the silicon alkoxide or its hydrolysate and the amount of water. When the concentration of the acid is within the range of 0.003–3 normality, the above reaction is hard to occur. The reaction becomes hard to bring about as the concentration of the silicon alkoxide or its hydrolysate or the amount of water decrease.

The present invention enabled the formation of a compact film at the ordinary temperature, because the silicon alkoxide in the coating liquid inhibits said dehydration condensation reaction, maintains monomer state as long as possible, and allows sudden reaction of equation (3) and equation (4) to form siloxane linkage upon application of the coating liquid on the surface of the base substrate and drying. If the silicon alkoxide is allowed to undergo hydrolysis and condensation polymerization reaction in the coating liquid as in the conventional techniques, the calcination step was required for producing a compact film because there was a tendency of a forming of gaps due to the fact that a bondage between polymers should be realized when the solution is applied on the surface of the base substrate and dried and there is a difficulty of forming a compact film. Accordingly, in the present invention, the silicon alkoxide or its hydrolysate in the coating liquid is preferably a monomer or a polymer that is less than 20-mer. When, however, the sum of the monomer, the hydrolysate and the polymer that is less than 20-mer is 80% by weight or more based on the total silicon alkoxide, the presence of a polymer that is a 20-mer or above is accepted.

In the present invention, the concentration of the acid catalyst in said coating liquid is maintained at 0.003–3 normality, 0.01–1 normality preferably. Because of this, the hydrolysis reaction of residual alkoxyl groups from said equation (3) and the dehydration condensation reaction in said equation (4) become hard to bring about in the coating liquid before applying but suddenly proceed immediately after the application of the coating liquid.

In addition, it is preferred that the concentration of the silicon alkoxide or its hydrolysate in the coating liquid is as low as possible because the hydrolysis reaction of residual alkoxyl groups from said equation (3) and the dehydration condensation reaction in said equation (4) become hard to bring about in the coating liquid before application, coupled with said acid concentration of the coating liquid. When, however, the concentration is too low, the thickness of the water repellent film becomes too thin, for example to less than 5 nm in thickness, resulting in a decrease in the ability of preventing diffusion of an alkaline component when the base substrate contains the alkaline component, and a tendency to a lowering in durability results. When, contrarily, the concentration of the silicon alkoxide or its hydrolysate exceeds 2% by weight, the thickness of the obtained water repellent film exceeds 200 nm, and the water repellent film is apt to be scratched and does not become a strong film. Accordingly, a preferred range of the concentration of the silicon alkoxide or its hydrolysate (including polymers of less than 20-mer) is 0.01–2% by weight, and a preferable range still is 0.01–0.6% by weight, converted to silica.

The hardness of the film tends to become low if the thickness of the water repellent film is too thick as described above, and the durability of the film tends to become low if it is too thin. Therefore, preferred thickness of the water repellent film is preferably 5–200 nm, preferably still 5–100 nm and more preferably 5–50nm.

If the concentration of the fluoroalkyl group-containing silane compound in the coating liquid is too low, the water-repellent performance decreases, and if the concentration is too high, the hardness of the film becomes low. Therefore, a preferred range of the concentration of the fluoroalkyl group-containing silane compound in the coating liquid is 0.00001–0.15% by weight, preferably still 0.0001–0.03% by weight, based on $SiO_2$ equivalent: MW=60. The ratio of the content of the fluoroalkyl group-containing silane compound (in weight converted to silica) to the content of the silicon alkoxide (in a weight based on $SiO_2$ equivalent: MW=60) in said coating liquid approximately corresponds to the content of the fluoroalkyl group to silica in the water repellent film after applying and drying. Accordingly, if the content of the fluoroalkyl group-containing silane compound as compared to the content of the silicon alkoxide in said coating liquid is too low, the water repellent ability of the water repellent film becomes lower, and if it is too high, the durability of the water repellent film becomes lower. Therefore, in the coating liquid, the value [the amount of the fluoroalkyl group-containing silane compound (based on $SiO_2$ equivalent: MW=60)]/[the amount of the silicon alkoxide or its hydrolysate (based on $SiO_2$ equivalent: MW=60)], as represented by weight, is preferably 0.0005–0.5, preferably still 0.0005–0.3, and more preferably 0.0005–0.05.

If a great amount of water is present in the coating liquid, hydrolysis reaction of the hydrolysate from the silicon alkoxide is promoted in the coating liquid before applying and the dehydration condensation reaction is apt to occur. In addition, the thickness of the film is apt to become uneven during drying after applying the coating liquid. Therefore, it is preferred that the concentration of water in the coating liquid is as low as possible. Accordingly, the concentration of water in the coating liquid is preferably 0–20% by weight, preferably still 0–10% by weight and most preferably 0–5% by weight. Keeping the concentration of water in the coating liquid in this manner is preferable because, coupled with maintenance of keeping the acid concentration of the coating liquid as described above and maintenance of keeping the concentration of silicon alkoxide (or its hydrolysate) in the coating liquid, the hydrolysis reaction of the residual alkoxyl group in equation (3) and dehydration condensation reaction in equation (4) becomes hard to bring about in the coating liquid before application. Even if the concentration of water in the coating liquid is zero, the hydrolysis reaction is not inhibited because the film after applying on the base substrate absorbs water in the air. When, however, alcohol is used as the solvent, the concentration of water in the coating liquid becomes 0.1% by weight or more because alcohol originally contains some water and the acid is often added as an aqueous solution.

It is preferable that said acid and water which is contained in above described coating solution, of which weight in the ratio acid/water is 0.002 or more, preferably still 0.02 or more. The reason is hydrolysis reaction of an alkoxyl group which is left from above described equation (3) and the dehydration condensation reaction of equation (4) tend not to occur in the coating liquid which has not been applied.

When a solution containing the silicon alkoxide, the fluoroalkyl group-containing silane compound and the acid in said proportion dissolved in a solvent is stirred, a hydrolysate is formed in the solution mainly from silicon alkoxide by the reaction of said equation (3) and a part of the hydrolysate undergoes dehydration condensation reaction by the reaction of said equation (4). In this manner, the coating liquid is prepared and the silicon alkoxide exists in the coating liquid in the form of a monomer (including the hydrolysate) or a polymer that is less than 20-mer.

When said coating liquid is applied onto the base substrate, the specific area of the liquid in the form of a film formed by applying increases so that the solvent in the film rapidly evaporates resulting in a sudden increase of concentration of the silicon alkoxide and its hydrolysate in the applied film. This allows sudden occurrence of the hydrolysis reaction and the dehydration condensation reaction (including further condensation polymerization reaction of the polymer that is said less than 20-mer) inhibited till then to produce many siloxane linkages (—Si—O—Si—) in the applied film. As a result, the bondage between the surface of the base substrate and the water repellent film becomes strong and a film mainly composed of silica and having a film thickness of 5–200 nm and a high compactness is produced. In this manner, in the present invention, reactivity during film formation is high, reaction occurs at room temperature, a very compact film is formed and post-calcination is not necessary.

When, as in the conventional technique, many siloxane linkages formed by the dehydration condensation reaction are already present in the coating liquid before applying and polymers having a degree of polymerization 20 or more are contained therein, the obtained water repellent film contains siloxane linkage but does not contain so many siloxane linkages binding the surface of the base substrate and the water repellent film. Therefore, the bondage between the surface of the base substrate and the water repellent film is not so strong. Thus, a further calcination at a high temperature is required in prior art in order to strengthen the bondage.

In addition, the water repellent film produced in the present invention has very good smoothness of surface. In other words, the surface of the water repellent film has a roughness represented by an arithmetic mean roughness (Ra)=0.5 nm or less and a ten-point mean roughness (Rz)= 5.0 nm or less. The roughness of the surface Ra and Rz can be measured by a method in which JIS B 0601 defined by two-dimensions is extended to three-dimensions, using an atomic force microscope (AFM) (manufactured by SEIKO Electronic Co., Ltd., scanning probe microscope "SPI3700", sensor lever: made of silicon "SI-DF20"). In this method, the area of the sample for measurement was a square of 1 $\mu$m×1 $\mu$m, and the measurement was carried out on the shape of the surface under conditions including the number of points to be measured of 512×256, the scanning velocity of 1.02 Hz under DFM (cyclic contact mode), with a correction by a low-pass filter and a leveling correction of measured data (a curved surface was obtained by the method of least squares for fitting, slant of data was corrected and, in addition, distortion in the direction of Z-axis was removed) to calculate the surface roughness Ra and Rz.

It is assumed that one reason for the fact that the water repellent film according to the present invention shows an excellent rolling property of water drops and an excellent scratching resistance is due to the smoothness of the surface of the water repellent film as described above. The grounds for providing excellent smoothness is supposed as follows. The silicon alkoxide and the fluoroalkyl group-containing silane compound, particularly silicon alkoxide is uniformly dissolved in the solvent in the form of a monomer (including hydrolysate) or a polymer that is less than 20-mer in the coating liquid before applying, and after applying, a compact water repellent film is produced at room temperature by the action of the existence of the acid catalyst in high concentration and the sudden increase of the concentration of the silicon alkoxide (including hydrolysate).

In contrast, when, for example, a chlorosilyl group-containing compounds such as tetrachlorosilane and a fluoroalkyl group-containing silane compound are dissolved in a non-aqueous solvent such as fluorine solvent, the chlorosilyl group-containing compound does not uniformly dissolve in the solvent. Therefore, the surface roughness of a water repellent film obtained by applying this solution on a substrate and drying is represented by an arithmetic mean roughness (Ra)=7.9 nm and a ten-point mean roughness (Rz)=29.8 nm or less and the smoothness for the water repellent film is inferior to that of the present invention. This means that the rolling property of water drops and the scratching resistance for this water repellent film is inferior to that of the present invention.

As described above, if the surface of the water repellent film, of which main component is silicon oxide and contains fluoroalkyl group, has the roughness of 0.5 nm or less represented by an arithmatic mean roughness (Ra) and has that of 5.0 nm or less represented by a ten-point mean roughness (Rz), the water repellent film of which rolling property of water drops is good and the scratch resistance is superior can be obtained. This water repellent film can be obtained by so called zolgel method which applies coating solution in which silicon alkoxide and the fluoroalkyl group-containing silane compound are contained especially suitably obtained by the present invention, the process for producing a product coated with a water repellent film.

In the present invention, the alkoxyl group (or acyloxy group or chlorine group) in the fluoroalkyl group-containing silane compound undergoes almost the same reaction as that of said silicon alkoxide in the coating liquid. When the coating liquid is applied onto the base substrate, due to the fact that the surface energy of the fluoroalkyl group is low, the fluoroalkyl silane component migrates toward the outside surface of the applied film, and/or the fluoroalkyl group-containing silane compound is oriented regularly in a manner that the fluoroalkyl group faces on the outside surface of the applied film. Therefore, the fluoroalkyl group exists at a higher concentration in the outside surface layer than the inside layer of the applied film. The reaction of equations (3) and (4); that is, the reaction in which silicon elements in the silicone alkoxide together form a siloxane linkage and the reaction in which silicon in the surface of the substrate and silicon in the silicon alkoxide together form a siloxane linkage are liable to occur as compared to the reaction in which the fluoroalkyl group-containing silane compound and silicon alkoxide together form a siloxane linkage, thus resulting in a tendency in which the fluoroalkyl group gathers in the most outside of the film.

With the progress of drying of said applied film, the alkoxyl group in the silicon alkoxide and the alkoxyl group (or acyloxy group or chlorine group) in the fluoroalkyl group-containing silane compound undergoes almost the same reaction as those of equations (3) and (4) while maintaining the orientation of said fluoroalkyl group-containing silane compound to result in a strong binding of the fluoroalkyl group-containing silane compound and silicon alkoxide through the siloxane linkage. Thus, a gel layer composed of a fluoroalkylsilane-modified silanol polymer is finally formed.

As the progress in drying of the applied film, a strongly bound silica layer is formed on the substrate, and the fluoroalkyl group is bound on the surface of the silica layer at a high density and in a regularly oriented state.

If the concentration of the acid in the coating liquid is lowered as compared to the present invention, and the concentration of the silicon alkoxide (or its hydrolysate) is higher than that in the present invention, or the amount of water is increased, the hydrolysis and dehydration condensation reaction of the fluoroalkyl group-containing silane compound proceed before applying in the coating liquid obtained, for example, at the 10$^{th}$ day after mixing by stirring. It was confirmed that the fluorine concentration at the surface of a water repellent film obtained by applying the coating liquid on a substrate and drying was about 0.5 as represented by the atomic ratio of F and Si: F/Si, by the X-ray photoelectron spectroscopy (ESCA). The test conditions for the X-ray photoelectron spectroscopy (ESCA) included an X-ray source using monochromatic Kα ray from aluminum, at an anode energy of 1486.6 eV, an anode output of 150 W, an acceleration voltage of 14 kV, an X-ray incident angle of 45° to a test sample, analytical area of a circle having a diameter of 800 μm, and thickness for measurement of several nm. On the other hand, in the present invention, said hydrolysis and dehydration condensation reaction of the silicon alkoxide (or its hydrolysate) and the fluoroalkyl group-containing silane compounds are inhibited before applying on the coating liquid obtained with keeping the concentration of the acid, the concentration of the silicon alkoxide (or its hydrolysate) and the amount of water in the coating liquid within the range defined in the present invention, and the reactions rapidly proceed on film formation after application. Accordingly, the fluorine concentration at the surface of a water repellent film obtained by the present invention was about 0.8 or more as represented by the atomic ratio of F and Si, for example F/Si=1.2. Thus, it was confirmed that the value is extremely high as compared to the case in which the hydrolysis and the dehydration condensation reaction proceed in the solution in said manner. In addition, when the hydrolysis and the condensation polymerization reaction proceed in said coating liquid, a calcination at 250° C. for about an hour is required in order to harden the film. There is a tendency that the rise in the temperature during the calcination causes inhibition of the water repellent action of the fluoroalkyl group through the diffusion of the alkaline component in the substrate. Since, however, the film obtained in the present invention has a sufficient hardness, a calcination is not required. In addition, if the film is calcined in order to increase hardness of the film, the alkaline component rarely diffuse in the film because the film has a sufficient compactness before calcination and therefore the water repellent action of fluoroalkyl group is not inhibited.

As described above, if the fluorine concentration at the surface of the water repellent film of which main component is silicon oxide and contains fluoroalkyl group is 0.8 or more as represented by the atomic ratio of fluorine atom and silicon atom, the water repellent film which excels in weatherability can be obtained, because the concentration of the water repellent group on the surface of the water repellent film is high.

This water repellent film can be obtained by so called sol-gel method, wherein the coating solution which contains silicon alkoxide and silane compound containing fluoroalkyl group is applied, especially preferably obtained by a process for producing a product of the water repellent coating articles.

Furthermore, it is considered that a water repellent layer having a better orientation than that of the conventional one in which a treatment for water repellent property is carried out by afterward chemical adsorption, hand painting or the like, because water repellent groups are naturally oriented during the formation of the film. Therefore, according to the present invention, a high density of the water repellent group is obtained on the surface of the water repellent film, the orientation of the water repellent group is excellent, and together with the effect of smoothness of the surface, an excellent rolling property of water drops, weatherability and scratching resistance are obtained.

In the present invention, preferred composition of the coating solution, preferred composition of the coating solution in order to form the water repellent film is shown as below.

| | |
|---|---|
| (A) silicon alkoxide or its hydrolysate (based on a $SiO_2$ equivalent: Mw = 60 | 0.01–2% by weight |
| (B) a fluoroalkyl group-containing silane copound (based on a $SiO_2$ equivalent: MW = 60 | 0.00001–0.15% by weight |
| (C) acid and | 0.003–3 normality |
| (D) water | 0–20% by weight |
| (E) alchohol remain | |

In the present invention, the coating liquid is prepared by adding the fluoroalkyl group-containing silane compound and the silicon alkoxide to the solvent, stirring for 10–60 minutes, then adding the catalyst, and stirring for 10–60 minutes. The life of the coating liquid is relatively long. When, however, the amount of the acid catalyst is relatively a little or the amount of water is much, it is preferred to apply the liquid within 2 hours from preparation, because there is a possibility that the hydrolysis and the condensation polymerization reaction may excessively proceed in the coating liquid before application. The water repellent product can be obtained by applying the coating liquid prepared as above on the surface of the substrate and then drying at room temperature for 10 seconds to 10 minutes to evaporate the solvent.

In addition, in the present invention, it is preferable to use an applying method of coating liquid in which the applied film is dried somewhat slowly, in order to make the water repellent groups orientated naturally at film-formation. Examples of the method include dip coating, flow coating, curtain coating, spin coating, spray coating, bar coating, roll coating, brush coating and the like. Among these, flow coating, dip coating and spray coating are especially preferable.

In the present invention, it is preferable that the applied film and the base substrate are set still and dried wherein, before solvent is evaporated and dried after the coating solution being applied on the surface of the base substrate by the coating method above described, coating solution forms the applying film which has equal wet thickness because the coating solution is smoothed by surface tension. Here, "set still" means to make the applied wet applying film having equal thickness using surface tension of the coating solution and then dried in the state, even if the base substrate is being transported at transporting speed of about 6 meters per minutes, it is considered as "set still" substantially.

Conventionally, when a water repellent film was formed on an alkali-containing substrate such as the soda lime glass by sol-gel method, the alkaline component in the substrate diffused in the film during the calcination which was carried out in order to improve hardness and compactness of the water repellent film. Such alkaline component lowered the durability of the water-repellent performance. To the contrary, in the present invention, the water repellent film has a high hardness and compactness without heating at the temperature exceeding 100° C., and a water repellent film with a very good durability is obtained.

According to the present invention, it is possible to calcine the film at a temperature 300° C. or less for the film formation, for the purpose of further increasing the compactness of the water repellent film, after applying said liquid for water repellent treatment on the surface of the substrate and with or without drying at room temperature or up to 100° C. Since the water repellent film has a sufficient compactness prior to the calcination, the alkaline component in the substrate rarely diffuses in the film even by a rise in temperature during the calcination, and the durability of the water-repellent performance does not decrease by the calcination.

The base substrate used in the present invention includes transparent or opaque plate-like material, rod-like material or other shape material of glass, ceramics, plastics, metal or the like. When the surface of the base substrate has a small number of hydrophilic groups, it is preferred to give surface treatment after giving treatment for making the surface of the base substrate hydrophilic by previously treating the surface with a plasma containing oxygen or in a corona atmosphere or alternatively, after giving treatment for making the surface of the base substrate hydrophilic by irradiating the surface of the base substrate with ultraviolet rays between the wavelength about 200–300 nm in an oxygen-containing atmosphere.

BEST MODE FOR CARRYING OUT THE INVENTION

Hereinafter, a description is given of preferred embodiments. The description of materials which are used repeatedly in the experimental example and comparative example and glass substrate are shown as below.

Heptadecafluorodecyl trimethoxysilane: $(CF_3(CF_2)_7(CH_2)_2Si(OCH_3)_3$, manufactured of Shinetsu Silicon K.K., tetraethoxysilane: $Si(OCH_2CH_3)_4$, manufactured by Shinetsu Silicon K.K.,ethanol: the quantity of water contained 0.35% by weight. "Solmix AP7" the mixed solution comprising 85% by weight ethanol, 5% by weight i-propanol, 10% by weight n-propanol, manufactured by Nihon Kaseihin K.K.

Concentrated hydrochloric acid: 35% by weight in its concentration, manufactured by Kanto Chemicals.

Glass substrate: float glass plates which are sodalime silicates 3 mm thickness and 150×150 mm size.

EXAMPLE 1

The solution for water repellent coating was obtained by adding 0.02 g of heptadecafluorodecyl trimethoxysilane and 1.2 g of tetraethoxysilane into 100 g of ethanol, the mixture was stirred for 30 minutes, and added 2 g of concentrated hydrochloric acid while being stirred. The composition of the solution for water repellent coating is shown in Table 1.The solution for coating was subjected to measurement with an apparatus for Fourier Transform Nuclear Magnetic Resonance (FT-NMR, "EX 270", manufactured by Nippon Electronic k.k.). There were observed an absorption peak at a chemical shift of −82 ppm indicating the presence of tetraethoxysilane monomer (and its (partial) hydrolysate), and an absorption peak at a chemical shift of −96 ppm indicating the presence of trimer of tetraethoxysilane but no absorption peak indicating the presence of polymers of tetramer or above. The solution for coating contained 0.34% by weight, converted to silica ($SiO_2$), of tetraethoxysilane and 0.002% by weight, converted to silica, of heptadecafluorodecyl trimethoxysilane, had a concentration of hydrochloric acid of 0.15 normality and water concentration of 1.6% by weight. Said water was derived from concentrated hydrochloric acid and ethanol. The solution for water repellent coating was applied onto the surface of a washed glass substrate at a humidity of 30% and at room temperature by the flow coating process, and the substrate was dried at room temperature for about 1 minute to give a water repellent glass plate.

The obtained water repellent glass plate was subjected to measurement of the contact angle of water as a static contact angle by a water drop having a weight of 2 mg using a contact angle meter (CA-DT, manufactured by Kyowa Kaimenkagaku K.K.). The greater value of contact angle indicates the better static water-repellent performance. As a measure for indicating the performance causing a rolling down of water drops on the water repellent glass plate, a water drop having a diameter of 5 mm was put on a horizontally placed water repellent glass plate, which was gradually inclined, and the angle of inclination (critical angle of inclination) of the glass plate at which the water drop put thereon began to roll was measured. The smaller critical angle of inclination indicates the better dynamic water-repellent performance and the fact that the sight of a driver is not obstructed because, for example, the rain drops on the windshield of a running car are easily scattered. The smoothness of the obtained water repellent glass was measured the shape of the surface at the cyclic contact mode using an atomic force microscope (SPI 3700, manufactured by SEIKO Electronic Co., Ltd.) to calculate the surface roughness as the value of arithmetical mean roughness Ra and that of ten-point mean roughness Rz.

Next, as a test for weatherability, ultraviolet rays were irradiated for 400 hours under conditions including an intensity of ultraviolet rays of 76±2 $mW/cm^2$, a black panel temperature of 48±2° C., in a cycle of irradiation period of 20 hours, dark period of 4 hours, with ion-exchange water showering for 30 seconds every 1 hour. After the irradiation, the contact angle of water and the critical inclination angle were measured. In addition, as a test for abrasion resistance, a dry cloth was fixed to a reciprocal abrasion tester (manufactured by Shinto Kagaku K.K.), and the cloth was reciprocally moved 3000 times under conditions of a charge of 0.3 $kg/cm^2$. Thereafter, the contact angle of water and the critical inclination angle were measured. Further, the thickness of the water repellent film was measured with a transmission electron microscope. The results of measuring the film thickness of the water repellent film, the surface roughness Ra, Rz,initial contact angle (the contact angle of water before the weatherability test and the abrasion resistance test), initial critical inclination angle (value before the weatherability test and the abrasion resistance test), the contact angle and the critical inclination angle after the weatherability test as well as the contact angle and the critical inclination angle after the abrasion resistance test are shown in Table 2.

EXAMPLE 2

The water repellent glass plate obtained in Example 1 was calcined at 250° C. for 1 hour to give a water repellent glass plate. The results of measurements carried out in manners similar to those in Example 1 are shown in Table 2.

EXAMPLES 3 and 4

A solution for water repellent coating was prepared in a manner similar to that in Example 1 except that 0.005 g or 0.05 g of heptadecafluorodecyl trimethoxysilane instead of 0.02 g was added in the preparation of the solution for water repellent coating in Example 1. The composition of the solution for water repellent coating is shown in Table 1. A water repellent glass plate was obtained by applying and drying the solution for water repellent coating in a manner similar to that in Example 1. The results of measurements carried out in a manner similar to that in Example 1 are shown in Table 2. The glass plates in which the amount of heptadecafluorodecyl trimethoxysilane is 0.005 g and 0.05 g were designated as the plates for Example 3 and Example 4, respectively. In the column of "degree of polymerization of silicon alkoxide" in Table 1, the degree of polymerization of tetraethoxysilane (and its (part) hydrolysate) as detected is shown by a range from the minimum (monomer being 1) to the maximum measured in a manner similar to that in Example 1 using an apparatus for Fourier Transform Nuclear Magnetic Resonance (FT-NMR) described in Example 1.

EXAMPLES 5 AND 6

A glass plate treated for water repellent was obtained in a manner similar to that in Example 1 except that the added amount of tetraethoxysilane in Example 1 was changed from 1.2 g to 0.3 g or 2.0 g, in the preparation of the solution for water repellent coating. The glass plates in which the amount of tetraethoxysilane is 0.3 g and 2.0 g were designated as the plate of Example 5 and Example 6, respectively. The composition of the solution for water repellent coating is shown in Table 1, and the results of measurements carried out in a manner similar to that in Example 1 are shown in Table 2.

EXAMPLE 7

To 100 g of ethanol were added 0.1 g of heptadecafluorodecyl trimethoxysilane and 6.0 g of tetraethoxysilane, and the mixture was stirred for 30 minutes. Then, 5.0 g of concentrated hydrochloric acid was added thereto with stirring to give a solution for water repellent coating. A washed glass substrate was dipped in a bath containing said solution for water repellent coating under conditions at a humidity of 30% and room temperature, pulled up at a rate of 10 cm/minute, and dried at room temperature for about 1 minute to give a water repellent glass plate. The composition of the solution for water repellent coating is shown in Table 1, and the results of measurements carried out in a manner similar to that in Example 1 are shown in Table 2.

EXAMPLE 8

A water repellent glass plate was obtained in a manner similar to that in Example 1 except that 0.02 g of heptadecafluorodecyl trichlorosilane ($CF_3(CF_2)_7(CH_2)_2SiCl_3$) was added instead of adding 0.02 g of heptadecafluorodecyl trimethoxysilane, in the preparation of the solution for water repellent coating in Example 1. The composition of the solution for water repellent coating is shown in Table 1, and the results of measurements carried out in a manner similar to that in Example 1 are shown in Table 2.

EXAMPLE 9

A glass plate water repellent was obtained in a manner similar to that in Example 1 except that 2 g of hydrochloric acid of 1 normality was added instead of adding 2 g of concentrated hydrochloric acid, in the preparation of the solution for water repellent coating in Example 1. The composition of the solution for water repellent coating is shown in Table 1, and the results of measurements carried out in a manner similar to that in Example 1 are shown in Table 2.

EXAMPLE 10

The solution for water repellent coating was obtained by adding 0.02 g of heptadecafluorodecyl trimethoxysilane and 0.3 g of tetraethoxysilane into 100 g of "Solmix AP7", the mixture was stirred for 30 minutes, and added 2 g of 1N hydrochloric acid (manufactured by Kanto Chemicals) while being stirred. The composition of the solution for water repellent coating is shown in Table 1.

The water repellent glass plate was obtained by applying this solution for water repellent coating onto the surface of the washed glass substrate using float coating method under the condition of 30% of humidity and room temperature, and dried for about 1 minute in room temperature. The results of measurements carried out in a manner similar to that in Example 1 are shown in Table 2.

EXAMPLE 11–13

The solution for water repellent coating was prepared in a manner similar to that in Example 10 except for adding 0.23 g of tetraethoxysilane and 0.02 g of heptadecafluorodecyl trimethoxysilane in Example 11, 0.3 g and 0.026 g in Example 12, and 0.27 g and 0.024 g in Example 13 instead of adding 0.3 g and 0.02 g in Example 10. The composition of the solution for water repellent coating is shown in Table 1. Then the water repellent glass plate was obtained after being applied.dried in a manner similar to that in Example 11 using this solution for water repellent coating. The results of measurements carried out in a manner similar to that in Example 1 are shown in Table 2.

EXAMPLE 14

The solution for water repellent coating was obtained by adding 0.1 g of heptadecafluorodecyl trimethoxysilane and 1.5 g of tetraethoxysilane into 100 g of ethanol, the mixture was stirred for 30 minutes, and added 2.0 g of concentrated hydrochloric acid while being stirred.

The water repellent glass plate was obtained by dipping the washed glass substrate in a bath of the said solution for water repellent coating under 30% of humidity and room temperature, pulling out at the speed of 10 cm per minute, and drying for about 1 minute in room temperature.

The composition of the solution for water repellent coating is shown in Table 1 and the results of measurements carried out in a manner similar to that in Example 1 are shown in Table 2.

EXAMPLE 15

The solution for water repellent coating was obtained by adding 0.004 g of heptadecafluorodecyl trimethoxysilane and 0.06 g of tetraethoxysilane into 100 g of ethanol, the mixture was stirred for 30 minutes, and added 2.0 g of concentrated hydrochloric acid while being stirred.

The transparent water repellent glass was obtained by applying the said solution for water repellent coating by spraying onto the surface of the washed glass substrate under 30% of humidity and room temperature, drying for about 3 minutes in room temperature, and forming a film of about 30 nm thickness. The composition of the solution for water repellent coating is shown in Table 1, and the results of measurements carried out in a manner similar to that in Example 1 are shown in Table 2.

EXAMPLE 16

The solution for water repellent coating was obtained by adding 0.02 g of heptadecafluorodecyl trimethoxysilane, 0.3 g of tetraethoxysilane and 0.015 g of methyltrimethoxysilane ($CH_3Si(OCH_3)_3$, manufactured by Tisso K.K.) into 100 g of solvent "Solmix AP7", the mixture was stirred for 30 minutes, and added 2 g of 1N hydrochloric acid (manufactured by Kanto Chemicals) while being stirred. The composition of the solution for water repellent coating is shown in Table 1.

The water repellent glass plate was obtained by applying this solution for water repellent coating using flow coating method onto the surface of the washed glass substrate, and drying for about 1 minute in room temperature. The results of measurement carried out in a manner similar to that in Example 1 are shown in Table 2.

It can be understood that the water repellent glass plates obtained in Examples 1 through 16 show an initial contact angle of 104° or more, an initial critical inclination angle of 9° or less and have an excellent water-repellent performance. While the water-repellent performance after the weatherability test have somewhat decreased, the contact angle and the critical inclination angle are 80° or more and 22° or less, respectively, and the contact angle and the critical inclination angle after the abrasion resistance test are 98° or more and 12° or less, respectively, from which it can be understood that they have an excellent durability. The coating liquids used in Examples 1 through 16, respectively, contained only the monomer or polymer that is less than 20-mer of tetraethoxysilane therein and did not contain tetraethoxysilane having a degree of polymerization of 20-mer or more. The thickness of the water repellent film was 20–100 nm and the surface roughness of the film was 0.5 nm or less in Ra and 5.0 nm or less in Rz, from which an excellent smoothness of the surface of water repellent film was confirmed. In addition, a much amount of the fluoroalkyl group was present in the outside surface layer of the film, in which the atomic ratio of F and Si namely F/Si was 0.8–1.5. It was confirmed that the inside layer was composed of silicon oxide by the X-ray photoelectron spectroscopy (ESCA).

COMPARATIVE EXAMPLE 1

To 81.2 g of ethanol were added 9.5 g of tetraethoxysilane and 0.26 g of heptadecafluorodecyl trimethoxysilane and the mixture was stirred for 20 minutes. Then, 4.04 g of water and 5.0 g of 0.1 N hydrochloric acid were added thereto and stirring was continued for 2 hours. The solution was placed in a sealed container and stood still at 25° C. for 10 days to give a solution for water repellent coating. This solution was diluted 5 times with ethanol to obtain a solution for water repellent treatment. The composition and so on of the solution for water repellent coating are shown in Table 1. The solution for water repellent treatment was applied onto a washed glass substrate by the flow coating process. The substrate was dried in a drying chamber at a humidity of 30% and at a temperature of 21° C., dried in air at 120° C. for 20 minutes, and then calcined at 250° C. for 1 hour to give a water repellent glass plate.

As shown in Table 2, while the water repellent glass plate obtained in the above had an initial contact angle of 101° which is considered good, its initial critical inclination angle was 15° and higher than those in examples, indicating that the rolling property of water drops is bad. The surface roughness of the obtained water repellent glass was 0.3 nm in Ra and 6.2 nm in Rz, showing that Rz exceeded 5.0 nm. The outside surface layer of the film contained few fluoroalkyl groups, and it was confirmed that the atomic ratio of F and Si namely F/Si was 0.5 by the X-ray photoelectron spectroscopy (ESCA). Further, the weatherability was also inferior and the contact angle and the critical inclination angle after the weatherability test were 65° and 35°, respectively, which are inferior as compared to 80° or more and 22° or less, respectively, in examples of the invention. In addition, the abrasion resistance was again inferior and the critical inclination angle after the abrasion resistance test are 18°, which was inferior as compared to 12° or less in examples. While the water repellent glass plate obtained by omitting said 1 hour calcination at 250° C. and including only applying and drying had an initial contact angle of 102° and an initial inclination angle of 13°, the contact angle and the inclination angle after the abrasion test were 76° and 31°, respectively, indicating that the abrasion resistance was extremely bad. The reason was possibly considered to be due to the fact that the hydrolysis and the condensation polymerization reaction of tetraethoxysilane proceeded in the solution for water repellent coating before application, which was caused by the high concentration of tetraethoxysilane in solution for water repellent coating (before dilution), and furthermore letting the solution stand still after preparation for 10 days, which resulted in formation of polymers of 20-mer or more of tetraethoxysilane.

COMPARATIVE EXAMPLE 2

To 85.3 g of ethanol were added 40 g of tetraethoxysilane and 1.92 g of heptadecafluorodecyl trimethoxysilane and the mixture was stirred for 20 minutes. Then, 16.6 g of water and 20.8 g of 0.1 N hydrochloric acid were added thereto and stirring was continued for 2 hours. The solution was placed in a sealed container and stood still at 25° C. for 24 hours to give a solution for water repellent coating. The composition of the solution for water repellent coating is shown in Table 1. A washed glass substrate was dipped in the solution for water repellent coating, pulled out for coating, dried and then calcined at 250° C. for 1 hour to give a water repellent glass plate.

As shown in Table 2, while the water repellent glass plate obtained in the above had an initial contact angle of 104° which is considered satisfactory, its critical inclination angle was 18° and higher than that in examples, indicating that the rolling property of water drops was inferior. The surface roughness of the obtained water repellent glass was 0.6 nm in Ra which exceeded 0.5 nm and 8.6 nm in Rz which exceeded 5.0 nm. Further, the weatherability was inferior and the contact angle and the critical inclination angle after the weatherability test were 67° and 38°, respectively, which are unsatisfactory as compared to 80° or more and 22° or less, respectively, in examples.

Also the scratching resistance was inferior and the critical inclination angle after the scratching test was 20° which was inferior when it was compared with that of 12° or less of Example.

COMPARATIVE EXAMPLE 3

To 40 g of $CF_3CF_2CHCl_2$ "Asahiclean AK-225", manufactured by Asahi Glass CO.) as a furon solvent were added 1 g of tetrachlorosilane and 1 g of heptadecafluorodecyl trichlorosilane and the mixture was stirred for 30 minutes to give a solution for water repellent coating. The composition of the solution for the water repellent coating is shown in Table 1. The solution for water repellent coating contained tetrachlorosilane in the form of monomer or dimer. The solution for water repellent coating was applied onto a washed glass substrate with a cotton pad under conditions at a humidity of 30% and room temperature, and after the substrate was dried, calcined at 93° C. for 1 hour, and the glass surface was freed from excess silane by washing with a solvent to give a water repellent glass plate.

As shown in Table 2, while the water repellent glass plate obtained in above had an initial contact angle of 112° which is considered satisfactory, its critical inclination angle was 34° and higher than that in examples, indicating that the rolling property of water drops was inferior. The surface roughness of the obtained water repellent glass was 7.9 nm in Ra which greatly exceeded 0.5 nm and 29.8 nm in Rz which greatly exceeded 5.0 nm, indicating that the smoothness of the water repellent surface was inferior. Further, the abrasion resistance was inferior and the contact angle and the critical inclination angle after the abrasion resistance test were 71° and 39°, respectively, which are unsatisfactory as compared to 98° or more and 12° or less, respectively, in examples of the invention. The reason is possibly due to the fact that unevenness of concentration occurred in the generating film because tetrachlorosilane was not uniformly dissolved in the fluorine solvent, producing fine size dents and projections on the surface of the water repellent film after drying.

COMPARATIVE EXAMPLE 4

To 79.24 g of iso-paraffin hydrocarbon solvent "Isopar L", manufactured by Exon) were added 0.36 g of tetrachlorosilane and 0.4 g of heptadecafluorodecyl trichlorosilane and the mixture was stirred for 30 minutes to give a solution for water repellent coating. The composition of the solution for the water repellent coating was shown in Table 1. The solution for water repellent coating contained therein tetrachlorosilane in the form of a monomer or dimer.

The solution for water repellent coating was applied onto a washed glass substrate with a flow coat under conditions at a humidity of 30% and room temperature, the substrate was dried and the glass surface was freed from excess silane by washing with a solvent to give a water repellent glass plate. The results of measurements carried out in a manner similar to that in Example 1 are shown in Table 2.

COMPARATIVE EXAMPLE 5

0.02 g of heptadecafluorodecyl trimethoxysilane and 1.2 g of tetraethoxysilane was added with being stirred for 30 minutes and then 2 g of 0.1N hydrochloric acid (manufactured by Kanto Chemicals) was added into 100 g of the solution of "Solmix AP7" with being stirred, then stand still under room temperature for 5 days to give the solution for the water repellent coating. The composition of the solution for the water repellent coating is shown in Table 1.

This solution for the water repellent coating was applied onto a washed glass substrate by the flow coating process, at humidity of 30% and room temperature, the substrate was dried for about a minute to give a water repellent glass plate. The results of measurements carried out in a manner similar to that in Example 1 are shown in Table 2.

COMPARATIVE EXAMPLE 6

0.02 g of heptadecafluorodecyl trimethoxysilane and 1.2 g of tetraethoxysilane was added with being stirred for 30 minutes and then 30 g of concentrated hydrochloric acid was added into 70 g of the solution of "Solmix AP7" with being stirred to give the solution for the water repellent coating. The composition of the solution for the water repellent coating is shown in Table 1.

This solution for the water repellent coating was applied and dried in a manner similar to that in Comparative Example 5 to give a water repellent glass plate. The results of measurements carried out in a manner similar to that in Example 1 are shown in Table 2.

COMPARATIVE EXAMPLE 7,8

The solution for water repellent coating was prepared in a manner similar to that in Example 1 except for adding 0.2 g and 0.0002 g of heptadecafluorodecyl trimethoxysilane respectively in Comparative Example 7 and 8 instead of adding 0.02 g in Example 1. The composition of the solution for the water repellent coating is shown in Table 1. Then applied and dried in a manner similar to that in Example 1 using this solution for water repellent coating to give a water repellent glass plate. The results of measurements carried out in a manner similar to that in Example 1 are shown in Table 2.

As shown in Table 2, the water repellent glass which was obtained Comparative Example 4 to 8 had 16° or more of initial critical inclination angle, which is higher compared to that of 9° or less in Example, and indicating that the rolling property of water was inferior.

Also the contact angle and the critical inclination angle after the abrasion resistance test were 80° or less and 20° or more, respectively, which are unsatisfactory as compared to that of 98° or more and 12° or less, respectively, in Example.

TABLE 1

| | Tetraethoxy-silane (wt % converted to silica (A)) | Fluoroalkyl group-containing silane compound (wt % converted to silica (B)) | Hydrochloric acid (normality) | Water (wt %) | Degree of polymerization of Tetraethoxy-silane |
|---|---|---|---|---|---|
| Example | | | | | |
| 1 | 0.34 | 0.0020 | 0.15 | 1.6 | 1–3 |
| 2 | 0.34 | 0.0020 | 0.15 | 1.6 | 1–3 |
| 3 | 0.34 | 0.0005 | 0.15 | 1.6 | 1–3 |
| 4 | 0.34 | 0.0051 | 0.15 | 1.6 | 1–3 |
| 5 | 0.085 | 0.0021 | 0.15 | 1.6 | 1–3 |
| 6 | 0.55 | 0.0020 | 0.15 | 1.6 | 1–3 |
| 7 | 1.56 | 0.0095 | 0.35 | 3.2 | 1–4 |
| 8 | 0.34 | 0.0020 | 0.15 | 1.6 | 1–3 |
| 9 | 0.34 | 0.0020 | 0.015 | 2.2 | 1–4 |
| 10 | 0.085 | 0.0021 | 0.015 | 2.2 | 1–4 |
| 11 | 0.065 | 0.0021 | 0.015 | 2.2 | 1–4 |
| 12 | 0.085 | 0.0027 | 0.015 | 2.2 | 1–4 |

TABLE 1-continued

| | Tetraethoxy-silane (wt % converted to silica (A)) | Fluoroalkyl group-containing silane compound (wt % converted to silica (B)) | Hydrochloric acid (normality) | Water (wt %) | Degree of polymerization of Tetraethoxy-silane |
|---|---|---|---|---|---|
| 13 | 0.076 | 0.0025 | 0.015 | 2.2 | 1–4 |
| 14 | 0.42 | 0.010 | 0.15 | 1.6 | 1–3 |
| 15 | 0.017 | 0.0004 | 0.15 | 1.6 | 1–3 |
| 16 | 0.085 | 0.0025 | 0.015 | 2.2 | 1–4 |
| Comparative example | | | | | |
| 1 | 0.55 | 0.0055 | 0.0008 | 2.1 | 4–30 |
| 2 | 7.0 | 0.12 | 0.010 | 22.9 | 4–30 |
| 5 | 0.34 | 0.0020 | 0.0015 | 2.3 | — |
| 6 | 0.34 | 0.0021 | 3.7 | 19.5 | — |
| 7 | 0.33 | 0.21 | 0.15 | 1.6 | — |
| 8 | 0.34 | 0.00002 | 0.15 | 1.6 | — |

TABLE 2

| | Film thickness of water repellent film (nm) | Initial contact angle (degree) | Initial critical inclination angle (degree) | Surface roughness of water repellent film Ra/Rz (nm)/(nm) | Contact angle/critical inclination angle after weatherability test (degree)/(degree) | Contact angle/critical inclination angle after abrasion resistance test (degree)/(degree) |
|---|---|---|---|---|---|---|
| Example | | | | | | |
| Example 1 | 60 | 111 | 5 | 0.4/2.9 | 83/20 | 106/8 |
| Example 2 | 60 | 110 | 6 | 0.4/3.8 | 85/18 | 107/9 |
| Example 3 | 60 | 104 | 9 | 0.3/2.8 | 80/21 | 103/10 |
| Example 4 | 60 | 111 | 5 | 0.3/3.1 | 85/19 | 99/10 |
| Example 5 | 20 | 110 | 6 | 0.5/4.6 | 80/22 | 98/12 |
| Example 6 | 100 | 109 | 6 | 0.2/1.8 | 88/17 | 105/9 |
| Example 7 | 80 | 111 | 4 | 0.3/2.6 | 87/17 | 106/8 |
| Example 8 | 60 | 111 | 5 | 0.4/3.3 | 84/19 | 105/10 |
| Example 9 | 60 | 108 | 7 | 0.4/3.5 | 80/20 | 104/10 |
| Example 10 | 30 | 109 | 5 | 0.3/1.9 | 88/16 | 102/9 |
| Example 11 | 25 | 111 | 5 | 0.4/3.1 | 86/19 | 104/9 |
| Example 12 | 30 | 109 | 6 | 0.5/3.4 | 82/20 | 105/10 |
| Example 13 | 30 | 108 | 7 | 0.4/3.5 | 80/21 | 105/10 |
| Example 14 | 30 | 109 | 6 | 0.2/1.8 | 88/19 | 105/9 |
| Example 15 | 30 | 110 | 4 | 0.3/2.4 | 84/21 | 106/8 |
| Example 16 | 30 | 108 | 5 | 0.4/1.9 | 90/17 | 108/9 |
| Comparative example | | | | | | |
| Comparative example 1 | 60 | 101 | 15 | 0.3/6.2 | 65/35 | 96/18 |
| Comparative example 2 | 100 | 104 | 18 | 0.6/8.6 | 67/38 | 97/20 |
| Comparative example 3 | 10 | 112 | 34 | 7.9/29.8 | 85/33 | 71/39 |
| Comparative example 4 | 10 | 110 | 18 | 3.2/19.3 | 83/22 | 38/46 |
| Comparative example 5 | 60 | 103 | 16 | —/— | 69/32 | 80/32 |
| Comparative example 6 | 60 | 104 | 20 | —/— | 67/38 | 64/20 |
| Comparative example 7 | 60 | 113 | 34 | —/— | 85/33 | 60/39 |
| Comparative example 8 | 60 | 87 | 37 | —/— | 46/22 | 38/46 |

INDUSTRIAL APPLICABILITY

As illustrated above, according to the present invention, a product coated with a compact and strong water repellent film can be obtained by applying on a base substrate a coating liquid in which a low concentration of a silicon alkoxide, a fluoroalkyl group-containing silane compound and a high concentration of volatile acid are dissolved in a solvent and drying the base substrate at ordinary temperatures. In the present invention, there is no necessity of calcining the water repellent film after film-formation. Therefore, large scale equipment is not required and costs for production are decreased.

In addition, since a fluoroalkyl group-containing silane compound which is converted to a water repellent group is added to a water repellent coating liquid, an $SiO_2$ layer and a water repellent layer can be formed by application of one kind of liquid. Therefore, productivity is excellent. Further, since $SiO_2$ component is apt to gather on the base substrate surface during film-formation and the water repellent groups are apt to orient the outer-most surface of the film, the water repellent film becomes a film in which the density of the water repellent group is higher in the outer-most surface and which is compact and has a long durability.

Furthermore, it is considered that, in the present invention, since the water repellent groups are naturally oriented during film-formation, a water repellent layer can be formed which has a better orientation than the product in which the water repellent treatment is given by post-chemical adsorption, hand-applying or the like as seen in the conventional process. Moreover, since a silicon alkoxide and a fluoroalkyl group-containing silane compound dissolve uniformly in a solvent such as alcohol forms a compact water repellent film at ordinary temperatures, the film surface becomes a water repellent film extremely excellent in smoothness. By the effects of said good orientation of the water repellent group, smoothness of the surface and high density of the water repellent group at the outer-most surface, the water repellent product in the present invention could have an extremely satisfactory rolling property of water drops, scratching resistance and weatherability.

What is claimed is:

1. A process for producing a product coated with a water repellent film, which comprises applying a coating liquid to a base substrate and subsequently drying said coating liquid, wherein said coating liquid contains:
    (A) 0.01–2% by weight (based on a $Sio_2$ equivalent: MW=60) of a tetraalkoxysilane, a hydrolysate thereof, or a polymer derived from said tetraalkoxysilane or hydrolysate thereof having an average degree of polymerization of 5 or less;
    (B) 0.00001–0.15% by weight (based on a $SiO_2$ equivalent: MW=60) of a fluoroalkyl group-containing silane compound;
    (C) 0.003–3 normality of a volatile acid; and
    (D) 0–20% by weight of water,
        wherein components (A), (B), and (C) are dissolved in a solvent.

2. The process for producing a product coated with a water repellent film according to claim 1, wherein said coating liquid contains:
    (A) 0.01–0.6% by weight (based on a $SiO_2$ equivalent: MW=60) of said tetraalkoxysilane, a hydrolysate thereof, or said polymer derived from said tetraalkoxysilane or hydrolysate thereof having an average degree of polymerization of 5 or less;
    (B) 0.0001–0.03% by weight (based on a $SiO_2$ equivalent: MW=60) of said fluoroalkyl group-containing silane compound;
    (C) 0.01–1 normality of said volatile acid; and
    (D) 0–5% by weight of water.

3. The process for producing a product coated with a water repellent film according to claim 1 or 2, wherein said coating liquid contains components (C) and (D) in an amount such that the weight ratio of (C)/(D) is 0.002 or more.

4. The process for producing a product coated with a water repellent film according to claim 1, wherein said coating liquid contains components (A) and (B) in an amount, such that the weight ratio of (B)/(A) is 0.0005–0.5.

5. The process for producing a product coated with a water repellent film according to claim 1, wherein said coating liquid contains component (A) in the form of a monomer (including hydrolysate) or a polymer with less than 20 repeating units.

6. The process for producing a product coated with a water repellent film according to claim 1, wherein said coating liquid is prepared by adding said components (A) and (B) into said solvent and stirred, and said volatile acid is added to said solvent and stirred.

7. The process for producing a product coated with a water repellent film according to claim 1, wherein said coating liquid further comprises methyltrialkoxysilane in an amount of 50 weight % or less (based on a $SiO_2$ equivalent: MW=60), wherein said weight % of methyltrialkoxysilane is based on the weight of component (A).

8. The process for producing a product coated with a water repellent film according to claim 1, wherein said applying and drying are done by forming a wet film at an even thickness using surface tension of the coating liquid on a surface of said base substrate, and then setting still said film and base substrate until they are dried.

9. The process for producing a product coated with a water repellent film according to claim 1, wherein said coating liquid is applied on a surface of said base substrate in order to make the thickness of the film 5–200 nm after said applying and drying.

10. The process for producing a product coated with a water repellent film according to claim 1, wherein said coating liquid is applied on a surface of said base substrate in order to make the thickness of the film 5–100 nm after said applying and drying.

11. The process for producing a product coated with a water repellent film according to claim 1, wherein said coating liquid is applied on a surface of said base substrate in order to make the thickness of the film 5–50 nm after said applying and drying.

12. The process for producing a product coated with a water repellent film according to claim 1, further comprising a calcination step after said drying step, wherein said calcination takes place at a temperature of between 100° C. and 300° C.

13. The process for producing a product coated with a water repellent film according to claim 1, wherein said tetraalkoxysilane is either tetramethoxysilane or tetraethoxysilane.

14. The process for producing a product coated with a water repellent film according to claim 1, wherein said fluoroalkyl group-containing silane is a silane compound which comprises at least one fluoroalkyl group and at least one hydrolysable group selected from an alkoxy group, an acyloxy group, or a chlorine group.

15. The process for producing a product coated with a water repellent film according to claim 14, wherein said fluoroalkyl group containing silane compound is heptadecafluorodecyl trimethoxysilane or heptadecafluorodecyl trichlorosilane.

16. The process for producing a product coated with a water repellent film according to claim 1, wherein said volatile acid is hydrochloric acid.

17. The process for producing a product coated with a water repellent film according to claim 1, wherein said solvent is an alcoholic solvent.

18. The process for producing a product coated with a water repellent film according to claim 1, wherein said base substrate is a transparent glass plate.

19. A product coated with a water repellent film obtainable by the process according to claim 1.

20. A liquid composition for coating with a water repellent film comprising:

(A) 0.01–2% by weight (based on a $SiO_2$ equivalent: MW=60) of a tetraalkoxysilane, a hydrolysate thereof, or a polymer derived from said tetraalkoxysilane or hydrolysate thereof having an average degree of polymerization of 5 or less;

(B) 0.00001–0.15% by weight (based on a $SiO_2$ equivalent: MW=60) of a fluoroalkyl group-containing silane compound;

(C) 0.003–3 normality of a volatile acid;

(D) 0–20% by weight of water; and (E) an alcohol as the balance.

* * * * *

UNITED STATES PATENT AND TRADEMARK OFFICE
CERTIFICATE OF CORRECTION

PATENT NO. : 6,511,753 B1  
DATED : January 28, 2003  
INVENTOR(S) : Teranishi et al.

It is certified that error appears in the above-identified patent and that said Letters Patent is hereby corrected as shown below:

<u>Title page, Item [54] and Column 1, line 1,</u>
Please change "PROCESS FOR PRODUCING ARTICLE COATED WITH WATER-REPELLENT FILM ARTICLE COATED WITH WATER-REPELLENT FILM AND LIQUID COMPOSITION FOR WATER-REPELLENT FILM, ARTICLE COATED" to -- PROCESS FOR PRODUCING ARTICLE COATED WITH WATER-REPELLENT FILM, ARTICLE COATED WITH WATER-REPELLENT FILM AND LIQUID COMPOSITION FOR WATER-REPELLENT FILM COATING --

Signed and Sealed this

First Day of July, 2003

JAMES E. ROGAN  
*Director of the United States Patent and Trademark Office*